US011995959B2

(12) United States Patent (10) Patent No.: US 11,995,959 B2
Giunti (45) Date of Patent: *May 28, 2024

(54) METHODS FOR SELLING PRE-PRINTED ONLINE LOTTERY TICKETS

(71) Applicant: Blackhawk Network, Inc., Pleasanton, CA (US)

(72) Inventor: Gino Giunti, Sault Ste. Marie (CA)

(73) Assignee: Blackhawk Network, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/859,338

(22) Filed: Jul. 7, 2022

(65) Prior Publication Data

US 2022/0343718 A1 Oct. 27, 2022

Related U.S. Application Data

(63) Continuation of application No. 16/280,629, filed on Feb. 20, 2019, now Pat. No. 11,488,451, which is a continuation of application No. 15/833,566, filed on Dec. 6, 2017, now Pat. No. 10,769,894, which is a continuation of application No. 14/679,028, filed on Apr. 6, 2015, now Pat. No. 9,865,135.

(Continued)

(51) Int. Cl.
*G06F 40/00* (2020.01)
*G06Q 20/20* (2012.01)
*G06Q 50/34* (2012.01)
*G07F 17/32* (2006.01)

(52) U.S. Cl.
CPC ......... *G07F 17/329* (2013.01); *G06Q 20/202* (2013.01); *G06Q 20/209* (2013.01); *G06Q 50/34* (2013.01); *G07F 17/3244* (2013.01)

(58) Field of Classification Search
None
See application file for complete search history.

(56) References Cited

U.S. PATENT DOCUMENTS 5,511,114 A 4/1996 Stimson et al.
5,577,109 A 11/1996 Stimson et al.
(Continued)

FOREIGN PATENT DOCUMENTS

WO 0159597 A1 8/2001

OTHER PUBLICATIONS

PayPal, PayPal Here App Helps You Process Payments Anywhere—Through One PayPal Account, Sep. 11, 2020, 4 pages, https://web.archive.org/web/20140401010545/htps://www.paypal.com/us/webapps/mpp/credit-card-reader-how-to.

(Continued)

*Primary Examiner* — Sunit Pandya
(74) *Attorney, Agent, or Firm* — Barnes & Thornburg LLP; Jerry C. Harris, Jr.

(57) ABSTRACT

A system and method of selling pre-printed lottery tickets for random draw lotteries through the retailers POS without the use of additional lottery hardware. Pre-printed lottery tickets allow a consumer to purchase a lottery ticket for a subsequently occurring draw by including that ticket in their shopping basket. The pre-printed lottery ticket may be purchased as any other common product through the point of sale terminal. No specialized hardware such as lottery terminal, printer or dispensing device is necessary.

24 Claims, 9 Drawing Sheets

Related U.S. Application Data (60) Provisional application No. 62/104,844, filed on Jan. 18, 2015.

(56) References Cited

U.S. PATENT DOCUMENTS

| | | | |
|---|---|---|---|
| 5,777,305 A | 7/1998 | Smith et al. | |
| 5,935,000 A * | 8/1999 | Sanchez, III | G07F 17/32 463/17 |
| 6,000,608 A | 12/1999 | Dorf | |
| 6,267,670 B1 | 7/2001 | Walker et al. | |
| 6,322,446 B1 * | 11/2001 | Yacenda | G07F 17/32 463/16 |
| 6,454,165 B1 | 9/2002 | Dawson | |
| 6,899,621 B2 | 5/2005 | Behm et al. | |
| 7,024,807 B2 | 4/2006 | Street | |
| 7,093,761 B2 | 8/2006 | Smith et al. | |
| 7,344,067 B2 | 3/2008 | Beck et al. | |
| 7,627,497 B2 * | 12/2009 | Szrek | G07G 1/12 705/24 |
| 8,083,133 B2 | 12/2011 | Seifert et al. | |
| 8,219,497 B2 * | 7/2012 | Crucs | G07F 17/329 705/64 |
| 8,408,986 B2 * | 4/2013 | Irwin, Jr. | G06Q 30/0607 101/483 |
| 8,424,758 B2 | 4/2013 | Esslinger et al. | |
| 8,706,630 B2 | 4/2014 | Graves et al. | |
| 8,784,180 B2 * | 7/2014 | Stanek | G07F 17/329 463/16 |
| 8,862,504 B2 | 10/2014 | Sobek | |
| 9,251,663 B1 * | 2/2016 | Sandvick | G07F 17/3258 |
| 9,405,984 B2 | 8/2016 | Irwin, Jr. et al. | |
| 9,865,135 B2 | 1/2018 | Giunti | |
| 10,296,895 B2 | 5/2019 | Llach et al. | |
| 2002/0119817 A1 * | 8/2002 | Behm | G06Q 30/0238 463/17 |
| 2004/0193464 A1 | 9/2004 | Szrek et al. | |
| 2005/0233797 A1 * | 10/2005 | Gilmore | G07F 17/42 463/17 |
| 2009/0163263 A1 | 6/2009 | Herndon et al. | |
| 2009/0227320 A1 * | 9/2009 | McBride | G07F 17/329 463/17 |
| 2010/0051691 A1 | 3/2010 | Brooks et al. | |
| 2010/0093421 A1 * | 4/2010 | Nyman | G06Q 20/108 705/42 |
| 2013/0041768 A1 | 2/2013 | Llach | |
| 2018/0096558 A1 | 4/2018 | Giunti | |

OTHER PUBLICATIONS

Missouri Lottery, Check My Tickets:: The Official Web Site of the Missouri Lottery, Sep. 4, 2020, 1 page, https://web.archive.org/web/20131031002206/http://www.molottery.com/numbers/check_my_tickets.jsp.

PGR2020-00084 in parent U.S. Pat. No. 10,769,894.

PGR2020-00085 in parent U.S. Pat. No. 10,769,894.

Appeal of Patent Trial and Appeal Board decision in PGR2020-00084—United States Court of Appeals for the Federal Circuit, Court of Appeals Docket No. 22-1650, *Blackhawk Network, Inc.* v. *Interactive Communications International, Inc.* (filed Apr. 13, 2022).

IPR2024-00465, Petition for the Inter Partes Review of the U.S. Pat. No. 11,488,451, Jan. 17, 2024, 91 pages.

PGR2020-00084, Petition for the Post-Grant Review of U.S. Pat. No. 10,769,894, Sep. 12, 2020, 136 pages.

PGR2020-00084, Final Written Decision U.S. Pat. No. 10,769,894, Mar. 15, 2022, 17 pages.

Appeal 2022-1650, Appeal from the United States Patent and Trademark Office, Patent Trial and Appeal Board in No. PGR2020-00084 U.S. Pat. No. 10,769,894 B2, Jun. 7, 2023, 5 pages.

Turk & Pentland, "Eigenfaces for Recognition", Journal of Cognitive Neuroscience, vol. 3, No. 1 (1991), 16 pages.

PGR20200084, Peitioner's Reply to Patent Owner's Response, Oct. 15, 2021, 43 pages.

Viola & Jones, "Rapid Object Detection Using a Boosted Cascade of Simple Features", Conference on Computer Vision and Pattern Recognition, 2001, 9 pages.

Complaint, *Blackhawk Network, Inc.* v. *SL Card Company Inc.* d/b/a Linq3, May 23, 2022, 61 pages.

PGR202000085, Petition for Post-Grant review of U.S. Pat. No. 10,769,894, Sep. 12, 2020, 80 pages.

IPR202301235, Petition for the Inter Partes Review of U.S. Pat. No. 9,865,135, Jul. 21, 2023, 88 pages.

* cited by examiner

METHODS FOR SELLING PRE-PRINTED ONLINE LOTTERY TICKETS

CROSS-REFERENCE TO RELATED APPLICATIONS

This application is a continuation application of, and claims priority to, U.S. patent application Ser. No. 16/280,629 filed on Feb. 20, 2019, which is a continuation application of and claims priority to U.S. patent application Ser. No. 15/833,566 filed on Dec. 6, 2017, issued as U.S. Pat. No. 10,769,894, which is a continuation application of and claims priority to U.S. patent application Ser. No. 14/679,028 filed Apr. 6, 2015, issued as U.S. Pat. No. 9,865,135, which claims benefit of Provisional Application No. 62/104,844 filed Jan. 18, 2015 titled "Methods For Selling Pre-printed Online Lottery Tickets."

FIELD OF DESCRIBED METHODS

The current disclosure relates to lottery systems and in particular to the sale and activation of pre-printed draw based lottery tickets through the retailers Point of Sale without the need for additional lottery hardware.

BACKGROUND AND SUMMARY OF THE INVENTION

Broadly there are two types of lotteries. The first is instant win lotteries where a printed ticket provides all of the lottery information. These tickets typically have a play area covered by scratch off material. The tickets can be purchased from a retailer, and the scratch off material removed to reveal whether the ticket is a winner. A second type of lottery is a draw-based lottery or "online" lottery, where a player makes a wager on a subsequently occurring event. For example, a player may guess at numbers that will be drawn. The selected numbers, or randomly selected numbers if the player does not have a preference for the numbers, are printed on a ticket and provided to the player. Once the event occurs, for example the numbers are drawn or generated by the lottery organization, the ticket may be a winner depending on if one or more of the selected numbers were drawn or generated.

Tickets for draw based lotteries are typically printed at the time of purchase on special ticket paper by a printing device approved by the lottery administering body. The ticket will typically have the draw details such as the date, the numbers that have been selected by the customer or generated on behalf of the customer and a control number that uniquely identifies that ticket. Special ticket paper typically meets critical longevity and stress requirements to ensure the ticket will not deteriorate within a certain period of time and that the control number and selected numbers remain legible.

Typically, the printing device is attached to a single lottery terminal operated by the lottery organization. Although the model of a single terminal and printer is effective for single checkout lane environments such as convenience stores and gas stations, it is not ideal for multi-lane environments such as grocery stores, discount and big box retailers. Here, the majority of customers complete their shopping and pay through any one of many checkout lanes. A second stop and purchase is required at the lottery terminal location in order to purchase the lottery draw ticket. This is extremely inconvenient for most customers who simply bypass the lottery counter.

Installing an approved printer or any other piece of specialized hardware at every point of payment within a retail environment is cost prohibitive and not an effective use of capital as not all points of payment are open at all times. This is one of the barriers to lottery organizations expanding their sales within multi-lane retail environments. Other barriers to installing specialized hardware in lane include the lack of available space and the added responsibility and training for the cashier who must operate the hardware.

Using the retailers POS to print the ticket on standard receipt paper is ineffective since receipt paper is typically of the lowest quality and the ticket can deteriorate prematurely if left if sunlight or comes in contact with water.

It would be desirable to enable customers to include a lottery draw ticket in their basket along with other goods and pay for that basket at any point of payment in a retail location. The inclusion of such a lottery draw ticket should not require any additional hardware in lane and should be fully serviced by the existing point of sale equipment. It is also desirable to merchandise draw based tickets in such a way that the customer experience is enhanced with the purchase convenience while increasing product awareness and impulse lottery purchases.

Described herein are methods for selling draw based tickets through the retailers POS without the use of additional hardware to generate or print the tickets.

DETAILED DESCRIPTION

Currently, online lottery products are produced by a lottery terminal or similar hardware. When an online lottery ticket, such as a ticket to a draw taking place at a later time, is purchased, a ticket is generated and printed by the lottery terminal and printer. A system is described further herein that provides the ability to include online lottery tickets that can be placed in a customer's shopping cart and paid for during the normal checkout process without the use of specialized hardware such as lottery terminals, ticket printers or customized devices at the point of purchase for the purpose of producing the lottery ticket. Since no specialized hardware is required, it is possible to pay for the online lottery tickets at any point of purchase. For example, at a grocery store, the online lottery tickets may be purchased at each check-out lane without requiring lottery terminals or hardware at each lane and as such, the incorporation of the purchasing at multiple lanes may be cost effective. In addition to the ability to purchase online lottery tickets at a point of sale without additional specialized lottery hardware, the systems and methods allow the online lottery ticket to be displayed and purchased as a common in-store product making the purchase of an online ticket common practice for the customer and the retailer.

The online lottery ticket is manufactured and distributed as pre-printed lottery tickets that do not have a draw date or wager (i.e. lottery numbers) assigned or associated to the pre-printed ticket. The pre-printed tickets would each have a unique bar code that identifies the particular pre-printed ticket and would also have a Universal Product Code bar code that would identify the lottery product. One bar code may contain both pieces of information. The pre-printed tickets are provided to retailers and are displayed to the consumer.

Until purchased and activated, the pre-printed tickets have no value, nor do they have any wager or draw date assigned. They cannot be used for validation or redemption purposes prior to purchase. Once scanned by the retailer's POS and paid for by the customer, the lottery system will generate wagers for the pre-printed ticket and assign the next available draw date. The generated numbers, the draw date and unique ticket identifier is printed on the customers shopping receipt. Although the draw information is printed on the customer's receipt, it is only information and the pre-printed lottery ticket is the legal instrument for validation and prize redemption. Draw information on the printed receipt also serves to confirm the activation of the pre-printed lottery ticket and the assignment of draw numbers and draw date.

Secure communications between the retailers POS system and the lottery system facilitate the successful completion of the above transaction and activation of the pre-printed ticket. As well, there may be a series of acknowledgments between systems to ensure the generation of the draw information and association of the draw information with the pre-printed ticket is successful and the draw information is printed on the receipt. Once activated, the pre-printed ticket may be subject to the same policies and procedures as standard online lottery tickets generated from specialized lottery terminals.

Alternatively, the communication and data transfers between the POS and lottery system may be facilitating by a transaction processor system. This may be effective where a third party system is already integrated with the retailers POS for the purpose of interchanging data and transactions.

Since the wager and draw date information is not printed on the pre-printed ticket, these details may be made available to the purchaser through other means including but not limited to the printed receipt, scanning the pre-printed ticket on existing lottery terminals or self-serve ticket checkers, and entering the pre-printed ticket's unique identifier into online websites or mobile applications.

A variation of the above is to produce pre-printed tickets with pre-printed wagers on the ticket. In such a case, when the pre-printed ticket with pre-printed wagers is purchased, the lottery system may simply assign the next draw date to the pre-printed ticket and activate the ticket within the lottery system. This lottery system in this variation will have a database of pre-printed tickets and associated lottery wagers.

Further, the pre-printed tickets may include different number and types of wagers. For example, a single pre-printed lottery ticket may be associated with purchasing 1, 2, 3 or more wagers. When the pre-printed tickets are associated with a plurality of wagers, each wager may be for the same or different online lottery games.

The ability to purchase an online lottery ticket at a point of sale check-out, as described herein, requires no additional hardware in lane and no special thermal or lottery paper or printer. The legal ticket, namely the pre-printed ticket, may not contain wagers and does not contain the draw date and is only associated with wagers or a draw date in the lottery system when activated by purchase. Given there is no value to the pre-printed ticket before activation, they can be distributed in locations that provide the most visibility and convenience for the customer with limited risk that the pre-printed ticket will be stolen. The pre-printed ticket is treated like an off the shelf commodity when checking out and should not impede the speed at checkout. The solution is extremely convenient for the customer with no additional interaction with the cashier required. Further, limited knowledge or expertise is required by the cashier. The solution may be easily scalable and can provide a cost effective solution to enable all checkout locations in all store locations to sell pre-printed online lottery tickets.

The pre-printed tickets may be manufactured and shipped to retail locations. Retailers may manage inventory and display the pre-printed tickets in, for example, checkout lanes, at counters and throughout the store where the product is most visible to customers. Customers can select a lottery product at any time with no additional interaction with a lottery retailer and drop the pre-printed lottery ticket(s) into their shopping cart. During the checkout process, the pre-printed ticket is scanned by the cashier in the retailer's POS as they would scan any other product being purchased. The pre-printed ticket may require one, possibly two scans dependent on the bar code standard used and the technical abilities of the retailer's POS system. Upon scanning of the ticket the retailer's POS will be updated with the product description and cost. The retailer's POS will communicate the transaction type, such as purchase or cancel, and the pre-printed ticket details, such as product information and/or a unique identifier, to the lottery system though a secure communications channel.

Upon receiving information for activating a pre-printed ticket being purchased, the lottery system may initiate a pre-printed ticket wager by validating the pre-printed ticket details, generating the appropriate lottery wager information, for example generating an appropriate number of random numbers for the draw. The generated wager information may then be associated with unique identifier of the pre-printed ticket in the lottery system and the pre-printed ticket activated for the next available draw. Confirmation of the activation, as well as the lottery numbers and draw information, for example when the draw is being held, may be withheld from the retailer's POS until payment confirmation is received by the lottery system. The cashier continues to scan the customer's purchases until the cart is empty. The cashier may then process payment as the normal course of action. Prior to the retailer's POS closing the sale and printing the receipt, the retailers POS system may communicate the payment confirmation and details to the lottery system. Once payment confirmation is received the lottery system may in turn communicate the lottery numbers and draw information to the retailers POS. This information may be communicated in the form of an image, text or any other message format deemed appropriate. The lottery numbers and draw date assigned to the pre-printed lottery ticket may be printed on the customer's store receipt. The printed receipt with the lottery information is for informational purposes only, and the pre-printed ticket would be required to validate the lottery numbers or to redeem a winning prize.

Rather than transmitting the pre-printed ticket information first, followed by confirmation of payment, it is possible to transmit the pre-printed ticket information to the lottery system only once the payment has been confirmed. Withholding the draw information until payment confirmation is received is optional and the lottery system may in turn communicate draw information to the POS upon being generated. Payment confirmation, if required, may contain but is not limited to transaction details such as the method of payment, transaction number, loyalty number or debit/credit card details. This level of information enables a complete audit trail to verify the true identity of the ticket owner in situations where ownership is disputed.

During the checkout process, age verification, if required, is done by the cashier. Where self-serve check-out kiosks are available, the retailer's POS may suspend the terminal operation until the age of the customer can be verified by store personnel or other means such as swiping of an identification card in co-operation with other bio-metric data. The transaction can then be approved or voided depending upon the determined age.

Purchased pre-printed tickets may be returned and cancelled, assuming the associated draw has not occurred. Tickets can be cancelled at two points in time, either during checkout, and prior to payment or after the basket has been paid for. Prior to payment a customer may change their mind and wish to have the pre-printed ticket removed from their basket. The transaction may be voided in the retailer's POS terminal as done with other common products. Additionally, if the pre-printed ticket information has already been communicated to the lottery system, another transaction may be performed indicating that the purchase of the pre-printed ticket was cancelled. The lottery system will cancel the pre-printed ticket and wager and draw information. Confirmation of the cancellation may be sent back to the POS terminal. The customer's receipt may show the inclusion and return of the pre-printed ticket but no draw or wager information will be shown on the receipt.

After the basket has been paid for and the pre-printed ticket has been activated, the customer may return and cancel the pre-printed ticket, for example at the retailer's customer service counter. Normal retailer and lottery return procedures may apply. The cashier may scan the pre-printed ticket barcode(s) into the POS. The retailer's POS will communicate the transaction type, i.e. cancellation, and pre-printed ticket details, such as product information and/or unique identifier, to the lottery system though a secure communications channel. The lottery system will locate the associated wager and cancel the transaction. The lottery system may send a confirmation to the retailer's POS along with the cancellation details, such as the pre-printed ticket identifier and/or cancellation date I time. The cancellation details may be returned in the form of an image. Cancellation information may be printed at the bottom of the customers return receipt.

Figure 1:
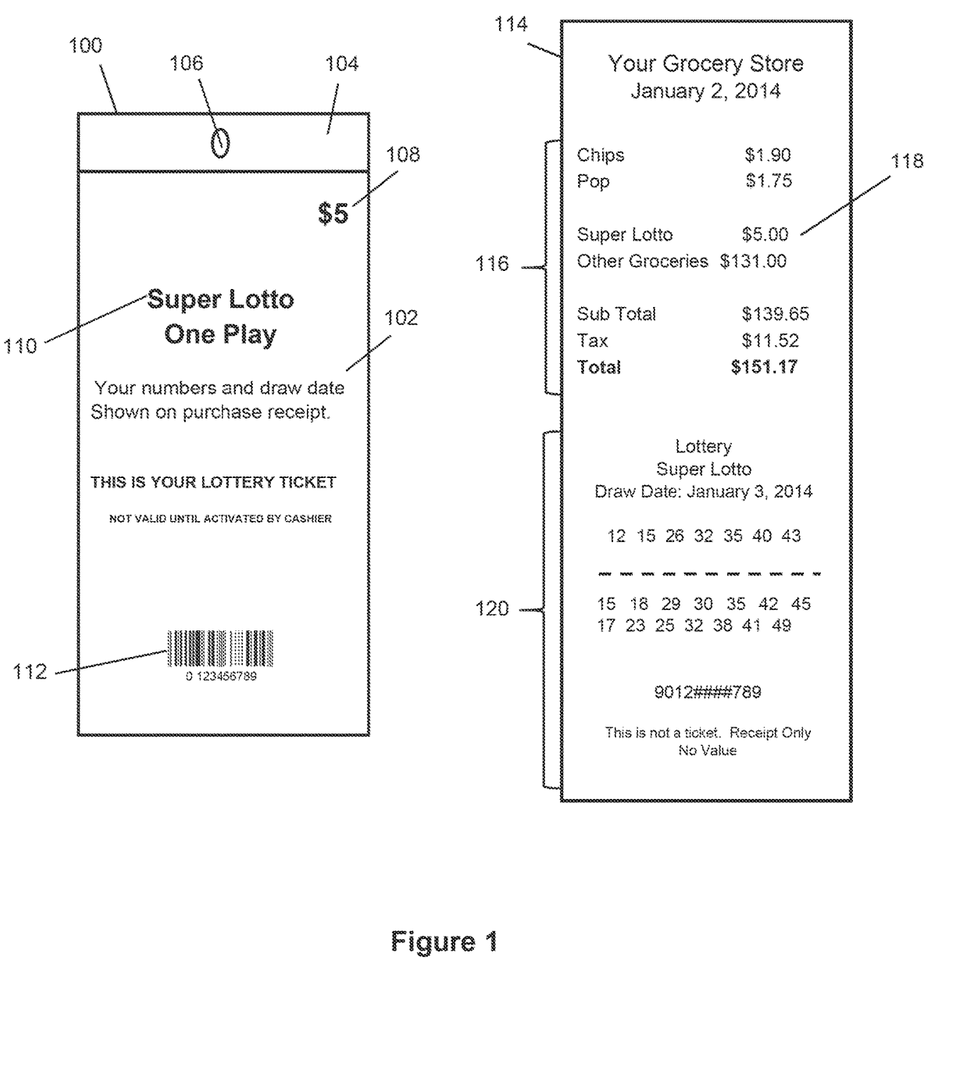
FIG. 1 depicts a pre-printed lottery ticket and purchase receipt.

FIG. 1 depicts a pre-printed lottery ticket and purchase receipt. A pre-printed ticket 100 may be placed at various locations in a retail environment. The pre-printed ticket 100 may have a main ticket portion 102 and may have a display portion 104 separable connected to the main ticket portion 102, for example by perforated or scored lines. The display portion 104 may include a hanging cut-out 106 in order to facilitate the display of the pre-printed ticket 100. The main ticket portion 102 includes advertising and purchase information, such as the cost of the pre-printed ticket 108 and the product the pre-printed ticket is for 110. Additionally, the main ticket portion 102 may include barcode information 112, which may be in the form of one or more barcodes although only one is depicted. Barcode information will contain the Ticket Unique Identifier, Universal Product Code and may contain price information. Although the specific physical characteristics of the pre-printed ticket are depicted in FIG. 1, it will be appreciated that the pre-printed tickets may take many different physical shapes.

FIG. 1 also depicts the shopping receipt 114 provided to the customer after the transaction is completed. The receipt is similar to commonly provided receipts and includes an itemized list of purchased items 116. The list 116 includes an indication 118 of the purchase of the pre-printed ticket. The receipt may also include draw and wager information 120 provided by the lottery system when the pre-printed ticket was activated. The draw and wager information 120, may include an indication of the draw date, the wager numbers and the unique ticket identifier which may be masked for security reasons. The unique ticket identifier included in 120 associates the receipt 144 to the pre-printed ticket 100. The draw and wager information associated with a pre-printed ticket may be checked by a consumer by other means, such as through a lottery terminal, lottery mobile application or lottery online site.

Figure 2:
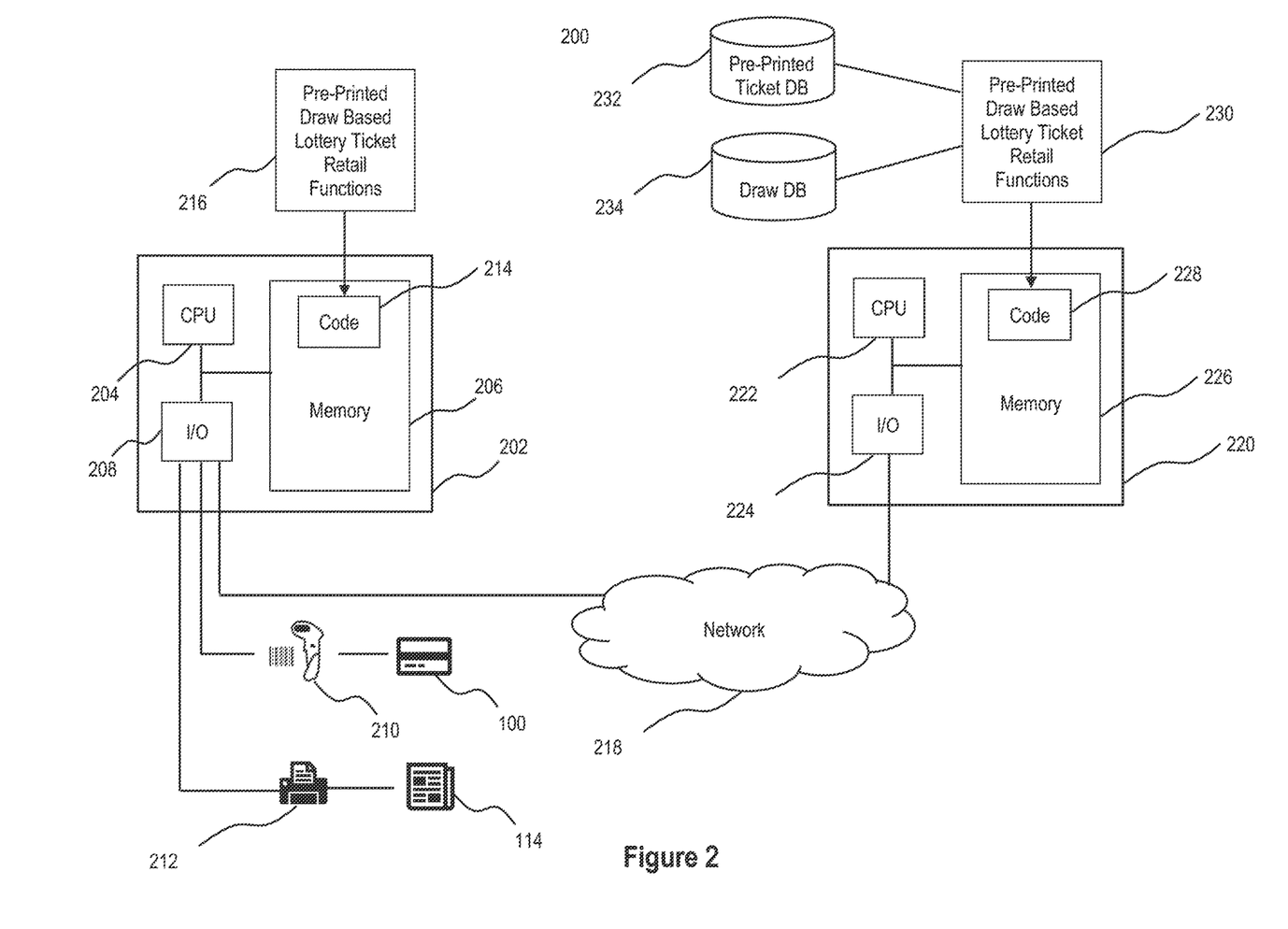
FIG. 2 depicts components of a point of sale and lottery system.

FIG. 2 depicts components of a lottery system and point of sale environment. As depicted, the environment 200 for purchasing a pre-printed lottery ticket includes a retailer's point of sale terminal 202 and a lottery system 220 connected to each other through one or more communication networks 218. The communication between retail POS terminals and the lottery system may be secured using various encryption techniques.

The retailer's POS terminal 202 may include a central processing unit (CPU) 204, memory unit 206 and I/O interface(s) 208 for communicating with devices external to the POS terminal. As depicted, a barcode scanner 210 may be connected for scanning in barcode information, such as Universal Product Code information, and pre-printed ticket information 100. The retailer POS terminal may also be connected to a printer 212 for printing a receipt 114 of the transaction. The POS terminal 202 includes instructions 214 stored in the memory unit, which when executed by the processor unit 204 configure the POS terminal 202 to provide pre-printed draw-based lottery ticketing functionality 216. The functionality 216 may provide the functionality for communicating scanned in barcode information of pre-printed lottery tickets with the lottery system, and receiving confirmation of the pre-printed ticket's activation, as described above.

The lottery system 220 may include a central processing unit (CPU) 222, memory unit 226 and I/O interface(s) 224 for communicating with devices external to the lottery system 220. Instructions 228 stored in the memory unit 226, when executed by the processing unit 222 configure the lottery system to provide pre-printed draw-based lottery ticket activation and cancellation functionality 230. The functionality 230 may receive and verify pre-printed lottery ticket information from a plurality of different retailers. The verification of the pre-printed lottery ticket information may involve checking that the received information corresponds to an actual ticket, verifying one or more check-digits, and/or verifying that the pre-printed lottery ticket was distributed to the retailer. The pre-printed ticket information used in verifying the received information may be stored in a pre-printed ticket information database 232. The functionality 230 may also generate draw and wager information and associate the pre-printed ticket information in a draw information database 234. The draw information database 234 may be used in verifying subsequent tickets, including the pre-printed lottery tickets, as winning tickets following the draw event.

Figure 3:
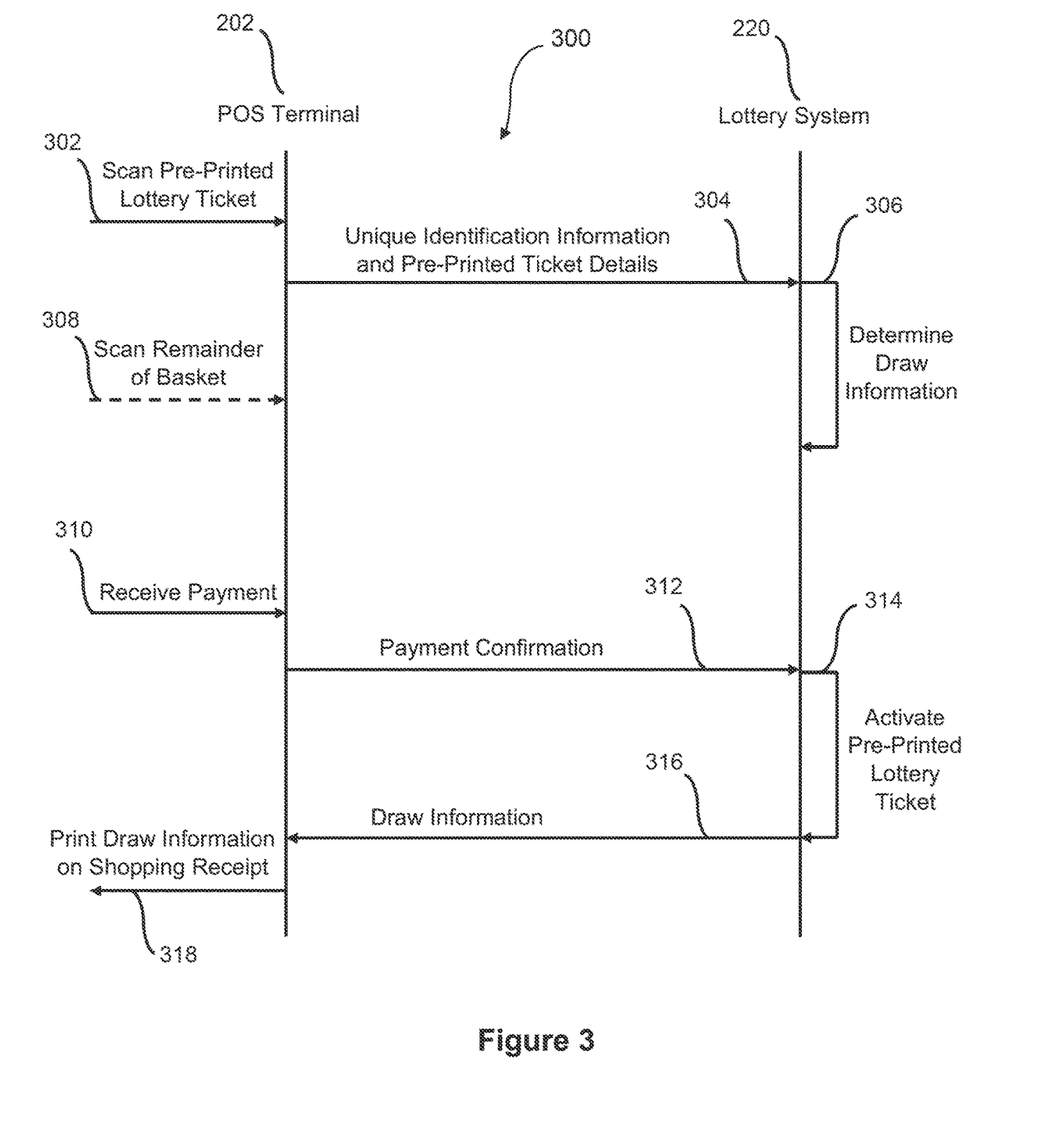
FIG. 3 depicts a process for providing a ticket for a draw lottery.

FIG. 3 depicts a process for providing a ticket for a random draw. The process 300 assumes a consumer is purchasing a number of items including a pre-printed lottery ticket. A pre-printed lottery ticket is scanned (302) at a POS terminal 202 and unique identification information and details of the pre-printed ticket is communicated (304) to a lottery system 220, which verifies the ticket information and determines draw and wager information (306), if the wager information is not already associated with the ticket information. Additional items being purchased may be scanned (308) by the POS terminal, and once all of the items being purchased are scanned, payment may be made (310), for example using cash credit or debit. After payment is received, the POS terminal 202 may communicate the payment confirmation (312) to the lottery system 220, which can activate the pre-printed lottery ticket (314) for the subsequent draw. The draw and wager information may be returned to the POS terminal (316) and printed on the customer's receipt (318). Once activated, the pre-printed ticket serves as a lottery ticket and may be verified as any regular lottery ticket purchased from a lottery terminal.

Figure 4:
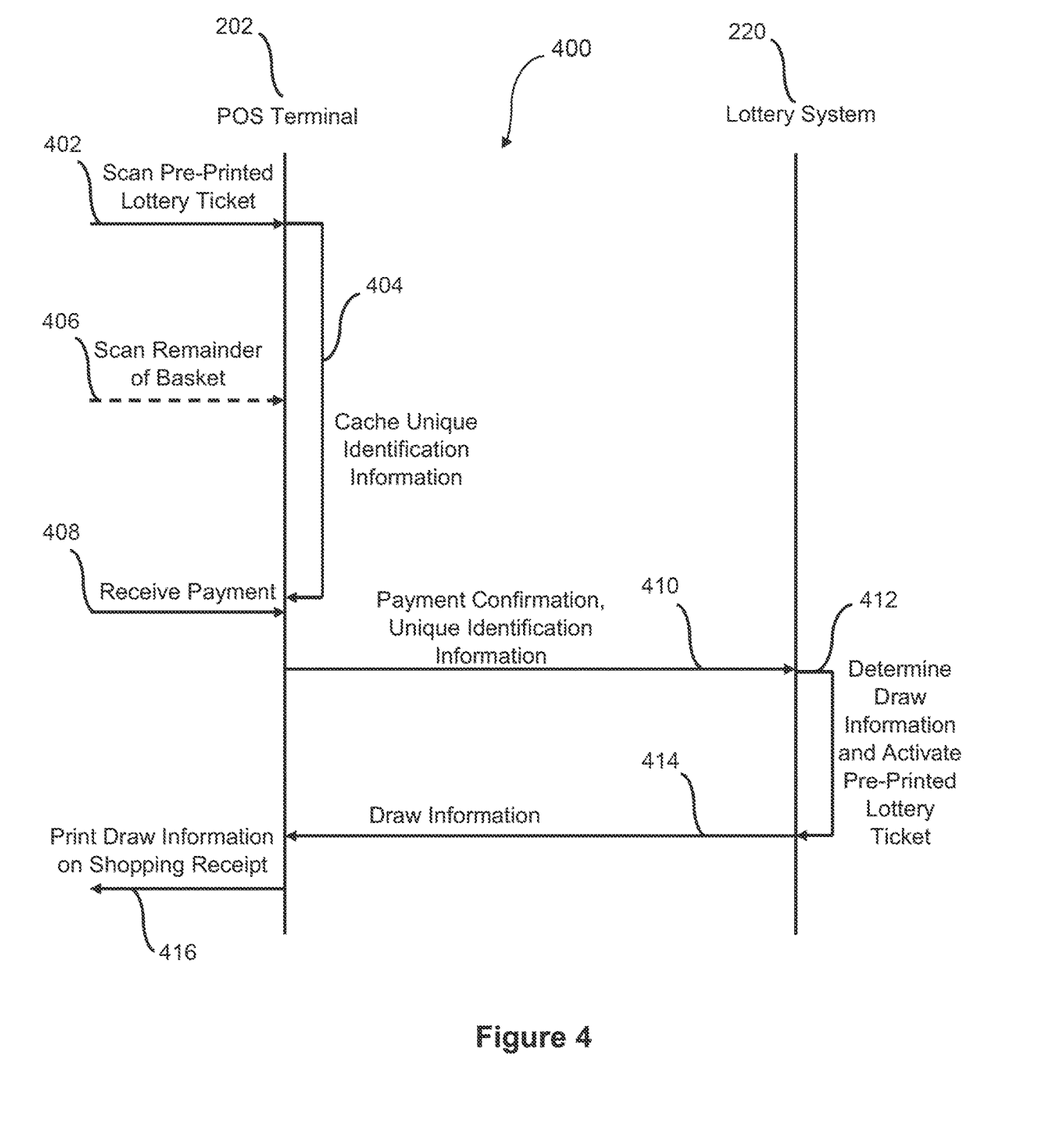
FIG. 4 depicts a further process for providing a ticket for a draw lottery.

FIG. 4 depicts a further process for providing a ticket for a random draw. The process 400 is similar to the process 300; however the unique ID is cached and transmitted with payment confirmation. A pre-printed lottery ticket is scanned (402) at a POS terminal 202 and unique identification information along with product information of the pre-printed ticket is cached at the POS terminal (404). Additional items being purchased may be scanned (406) by the POS terminal, and once all of the items being purchased are scanned, payment may be made (408), for example using cash credit or debit. After payment is received, the POS terminal 202 may communicate the payment conformation (410) and the cached unique identification information of the pre-printed lottery ticket to the lottery system 220. The lottery system may receive and verify the ticket information and determine draw and wager information, if the wager information is not already associated with the ticket information and which can activate the pre-printed lottery ticket (412) for the subsequent draw. The draw and or wager information may be returned to the POS terminal (414) and printed on the customer's receipt (416). Once activated, the pre-printed ticket serves as a lottery ticket and may be verified as any regular lottery ticket purchased from a lottery terminal.

Figure 5:
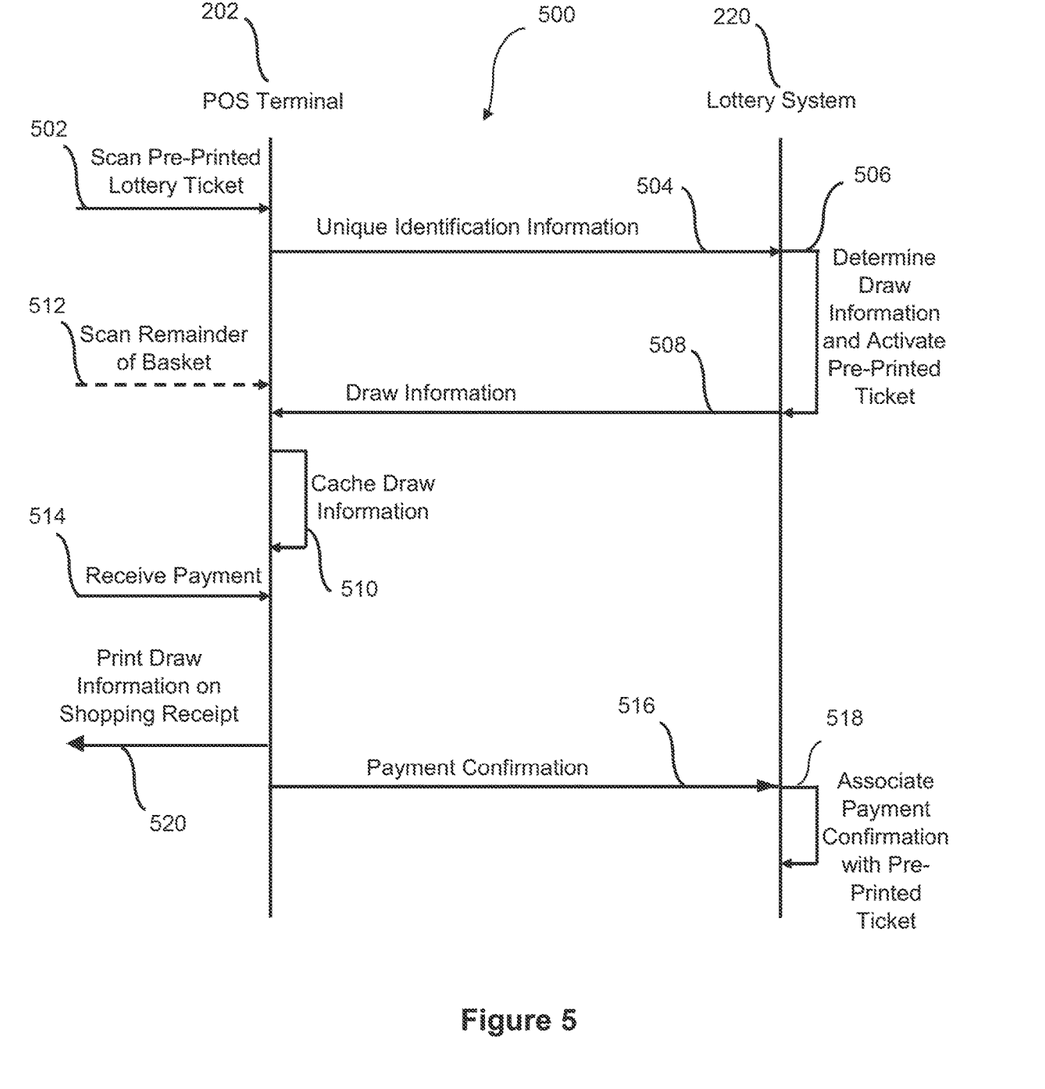
FIG. 5 depicts a further process for providing a ticket for a draw lottery.

FIG. 5 depicts a further process for providing a ticket for a random draw. The process 500 is similar to the process 300; however the determination of the draw and wager information by the lottery system and communication of the information to the POS is not dependent on the receiving of payment by the POS. A pre-printed lottery ticket is scanned (502) at a POS terminal 202 and unique identification information along with product information of the pre-printed ticket is communicated (504) to a lottery system 220, which verifies the ticket information, determines draw and wager information, if the wager information is not already associated with the ticket information and activates the pre-printed ticket (506). The lottery system 220 communicates the draw information (508) to the POS 202 where it is cached (510) by POS Terminal 202.

Additional items being purchased may be scanned (512) by the POS terminal, and once all of the items being purchased are scanned, payment may be made (514), for example using cash credit or debit. After payment is received, the POS terminal 202 may communicate the payment conformation (516) to the lottery system 220, which can associate the payment confirmation and details with the pre-printed ticket (518). The POS 202 may print the draw and wager information on the customer's receipt (520). Once activated, the pre-printed ticket serves as a lottery ticket and may be verified as any regular lottery ticket purchased from a lottery terminal.

Figure 6:
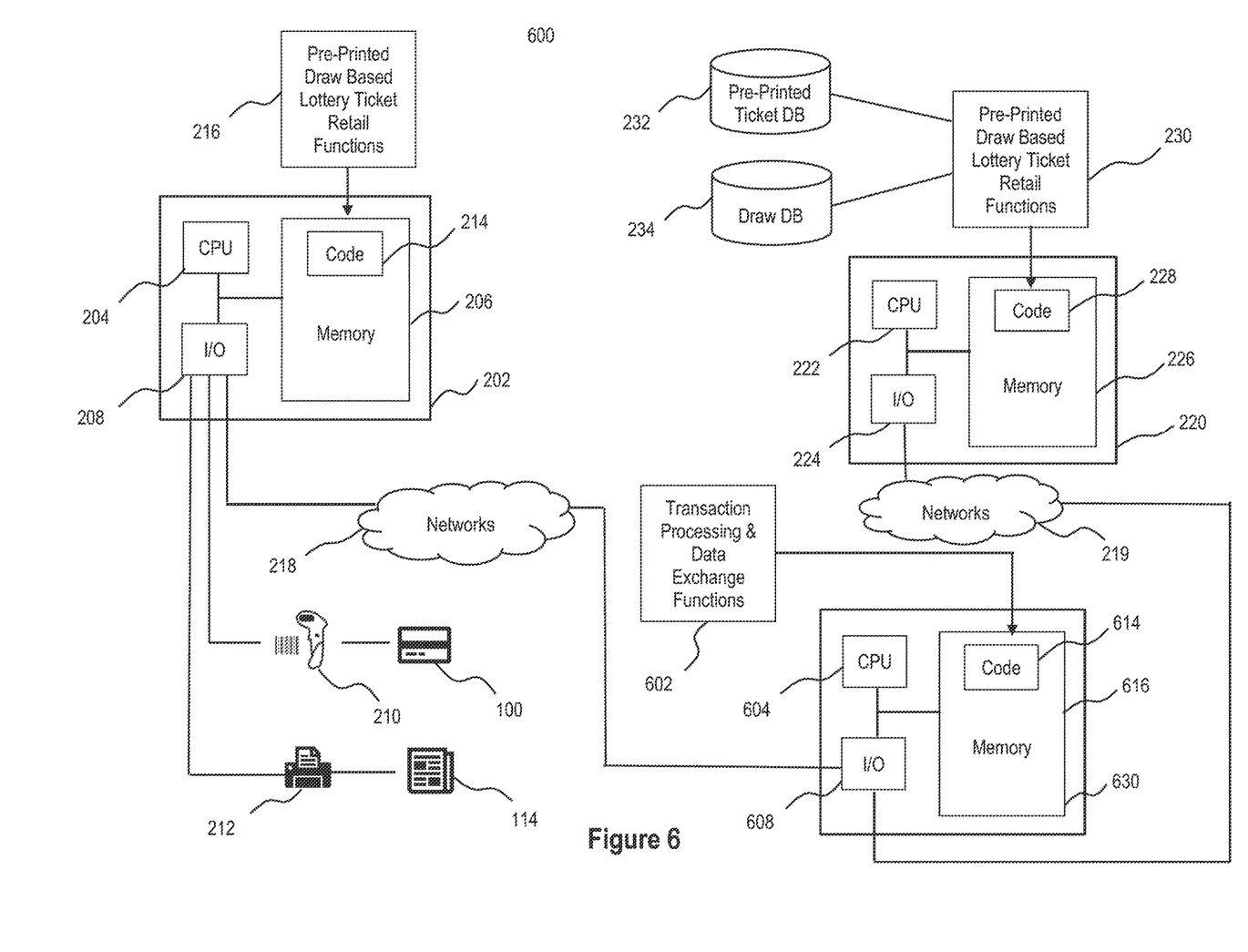
FIG. 6 depicts components of a point of sale, transaction processor and lottery system.

FIG. 6 depicts components of a lottery system, point of sale environment and a transaction processor. As depicted, the environment 600 for purchasing a pre-printed lottery ticket includes a retailer's point of sale terminal 202 for the retail of the pre-printed ticket, a lottery system 220 for the generation and activation of pre-printed ticket wagers and draw date and a transaction processor 630 to facilitate the exchange of data between the retailer's point of sale 202 and the lottery system 220 each connected to one other through one or more communication networks 218; 219. The communication between retail POS terminals, the transaction processor and the lottery system may be secured using various encryption techniques.

The retailer's POS terminal 202 may include a central processing unit (CPU) 204, memory unit 206 and I/O interface(s) 208 for communicating with devices external to the POS terminal. As depicted, a barcode scanner 210 may be connected for scanning in barcode information, such as Universal Product Code information, and pre-printed ticket information 100. The retailer POS terminal may also be connected to a printer 212 for printing a receipt 114 of the transaction. The POS terminal 202 includes instructions 214 stored in the memory unit, which when executed by the processor unit 204 configure the POS terminal 202 to provide pre-printed draw-based lottery ticketing functionality 216. The functionality 216 may provide the functionality for communicating scanned in barcode information of pre-printed lottery tickets with the transaction processor system, and receiving confirmation of the pre-printed ticket's activation, as described above.

The lottery system 220 may include a central processing unit (CPU) 222, memory unit 226 and I/O interface(s) 224 for communicating with devices external to the lottery system 220. Instructions 228 stored in the memory unit 226, when executed by the processing unit 222 configure the lottery system to provide pre-printed draw-based lottery ticket activation and cancellation functionality 230. The functionality 230 may receive and verify pre-printed lottery ticket information from a plurality of different retailers. The verification of the pre-printed lottery ticket information may involve checking that the received information corresponds to an actual ticket, verifying one or more check-digits, and/or verifying that the pre-printed lottery ticket was distributed to the retailer. The pre-printed ticket information used in verifying the received information may be stored in a pre-printed ticket information database 232. The functionality 230 may also generate draw and wager information and associate the pre-printed ticket information in a draw information database 234. The draw information database 234 may be used in verifying subsequent tickets, including the pre-printed lottery tickets, as winning tickets following the draw event.

The transaction processor system 630 may include a central processing unit (CPU) 604, memory unit 616 and I/O interface(s) 608 for communicating with devices external to the transaction processor system 630. Instructions 604 stored in the memory unit 616, when executed by the processing unit 604 provide transaction processing and data exchange functionality 602. The functionality 602 may process transactions and exchange data from a plurality of different retailers to a single lottery system. Instructions 602 may include any functionality necessary for the successful exchange of data and the activation or cancellation of the pre-printed ticket.

Figure 7:
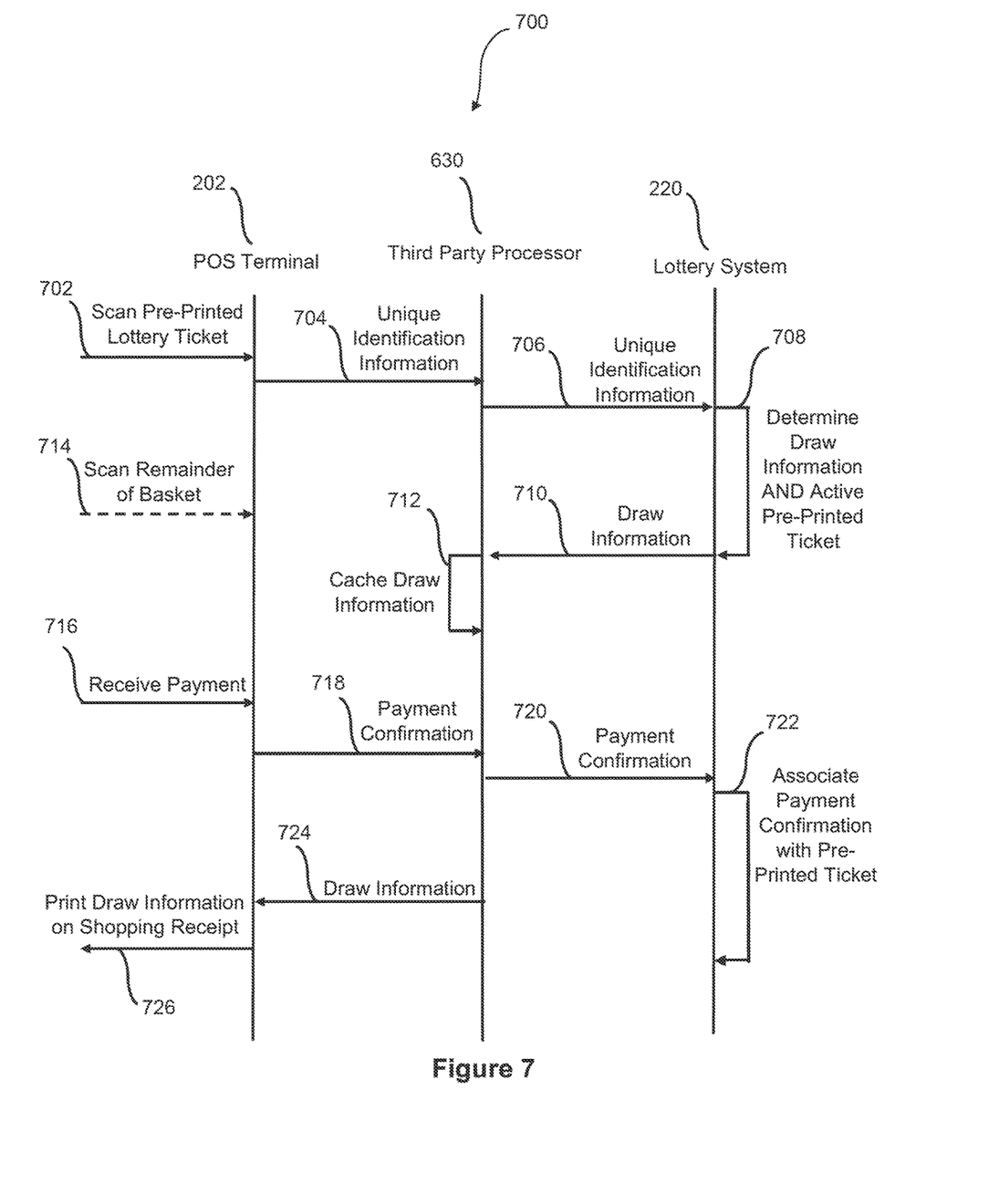
FIG. 7 depicts a process for providing a ticket for a draw lottery through a transaction processor.

FIG. 7 depicts a process for providing a ticket for a random draw through a transaction processor. The process 700 assumes a consumer is purchasing a number of items including a pre-printed lottery ticket. A pre-printed lottery ticket is scanned (702) at a POS terminal 202 and unique identification information and details of the pre-printed ticket is communicated (704) to the transaction processor 630 who in turn communicates (706) the unique identifier and pre-printed ticket details to a lottery system 220, which verifies the ticket information and determines draw and wager information and activates the pre-printed ticket (708), if the wager information is not already associated with the ticket information. Draw information is communicated (710) to the transaction processor 630 and is cached within their system (712). Additional items being purchased may be scanned (714) by the POS terminal, and once all of the items being purchased are scanned, payment may be made (716), for example using cash credit or debit. After payment is received, the POS terminal 202 may communicate the payment confirmation (718) to the transaction processor 630. The transaction processor 630 may also communicate (720) payment confirmation to the lottery system 220, which can associate payment confirmation (722) with the pre-printed ticket. The transaction processor 630 may communicate the draw and wager information (724) to the POS terminal 202 and print the draw information on the customer's receipt (726). Once activated, the pre-printed ticket serves as a lottery ticket and may be verified as any regular lottery ticket purchased from a lottery terminal.

Understandably, the sequencing of the communications between the POS terminal 202, the lottery system 220 or transaction processor 630 may vary depending on the rules put in place between the parties.

Figure 8:
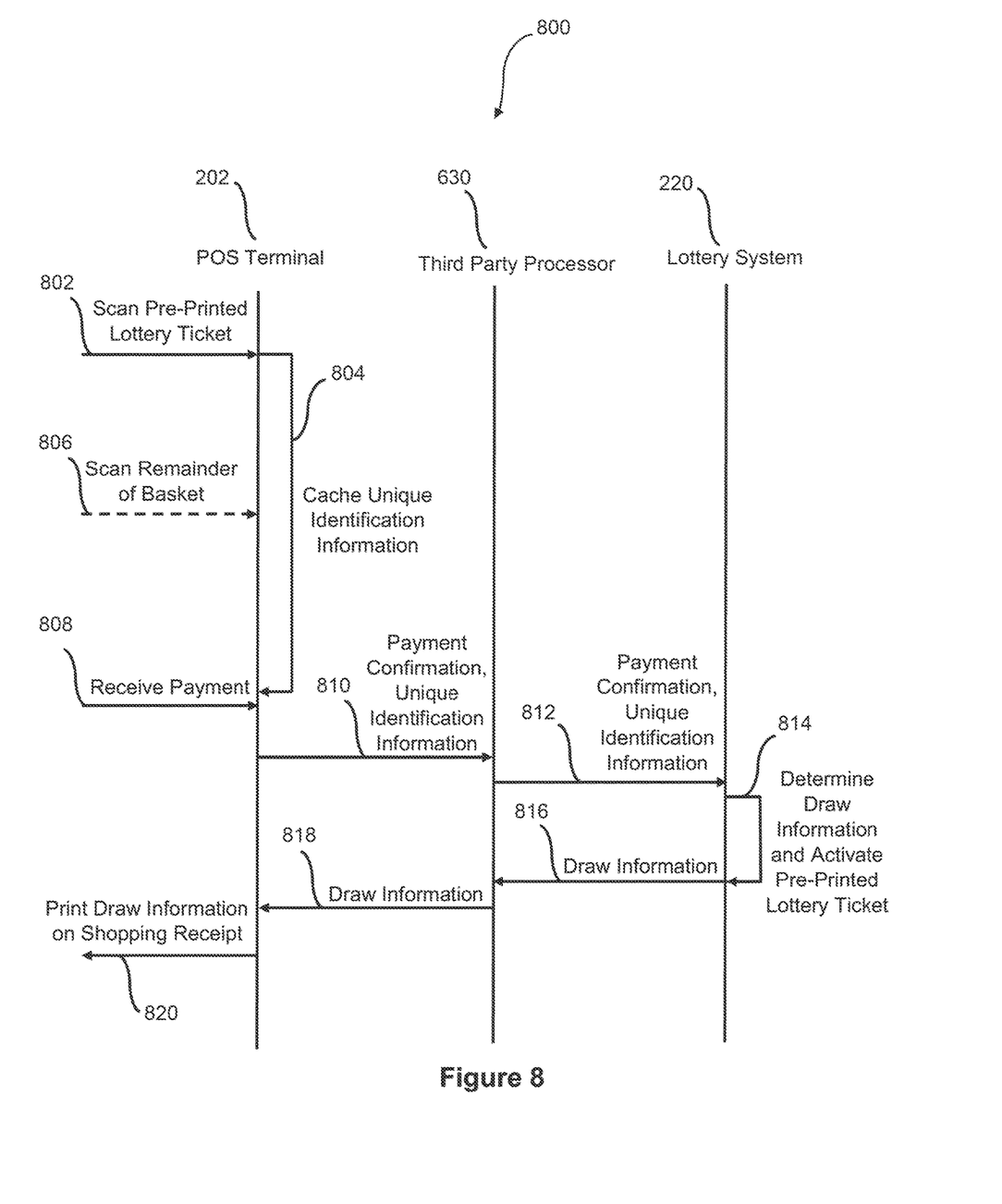
FIG. 8 depicts a further process for providing a ticket for a draw lottery through a transaction processor.

FIG. 8 is similar to FIG. 7 except draw information and activation of the pre-printed ticket is complete after payment confirmation is received by the lottery system 220. The process 800 assumes a consumer is purchasing a number of items including a pre-printed lottery ticket. A pre-printed lottery ticket is scanned (802) at a POS terminal 202 and unique identification information and details of the pre-printed ticket is cached (804) within the POS terminal 202. Additional items being purchased may be scanned (806) by the POS terminal, and once all of the items being purchased are scanned, payment may be made (808), for example using cash credit or debit. After payment is received, the POS terminal 202 may communicate the payment confirmation and unique identification information (810) to the transaction processor 630. The transaction processor 630 may communicate (812) the payment confirmation and unique identification information to the lottery system 220. The lottery system 220 verifies the ticket information and determines draw and wager information and activates the pre-printed ticket (814), if the wager information is not already associated with the ticket information. Draw information is communicated (816) to the transaction processor 630. Draw information is then communicated (818) to the POS terminal 202 where draw information is printed on the customer shopping receipt (820). Once activated, the pre-printed ticket serves as a lottery ticket and may be verified as any regular lottery ticket purchased from a lottery terminal.

Understandably, the sequencing of the communications between the POS terminal 202, the lottery system 220 or transaction processor 630 may vary depending on the rules put in place between the parties.

Figure 9:
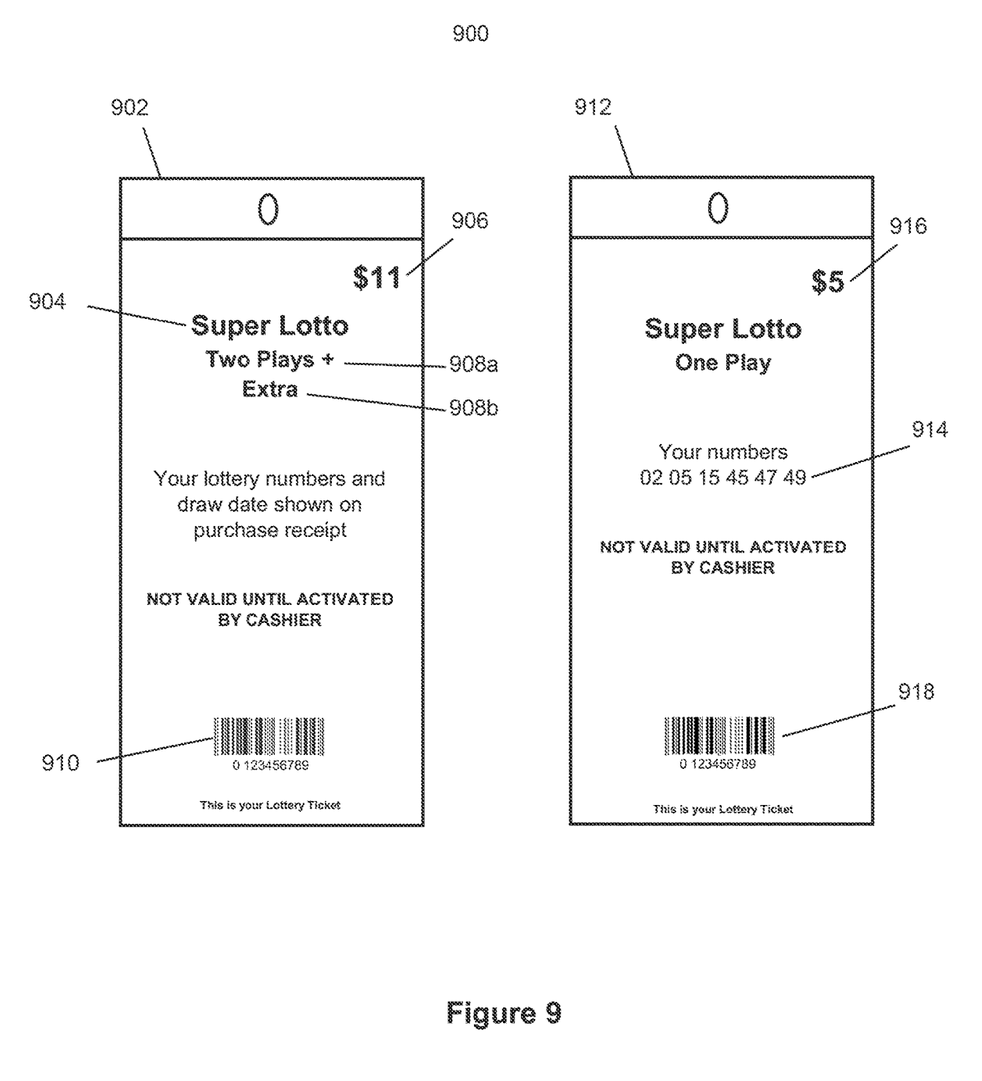
FIG. 9 depicts additional or alternative pre-printed lottery tickets.

FIG. 9 depicts additional or alternative preprinted lottery tickets. As depicted, pre-printed lottery ticket 902 is for two play or wagers plus a bonus, which may be indicated by additional play information 904 and/or may be reflected by the price 906 of the pre-printed ticket. The pre-printed lottery ticket 902 is depicted as providing separate wagers for two products 908*a*, 908*b*. Wager and draw information will be generated and activated for a subsequent Super Lotto draw and a subsequent Extra draw. The information for the draw and wager information that needs to be generated may be stored by the lottery system and associated with unique information that can be stored in the barcode 910.

Pre-printed lottery ticket 912 is depicted as being for a single product and wager. However, unlike the other pre-printed lottery tickets described above, the pre-printed lottery ticket 912 is already associated with wager information 914 which may be printed on the ticket to allow selection of preferred numbers by a consumer. Accordingly, the pre-printed ticket 912 includes a purchase amount indication 916 and product or game information, as well as the wager information, which is depicted as being the numbers of the draw 914. When the bar-code 918 of the pre-printed ticket is scanned, the unique ID information may be used to activate the pre-printed ticket with the subsequent draw. The wager information does not need to be generated since it is already generated and associated with the pre-printed lottery ticket in the lottery system, for example at the time of manufacture or printing.

Understandably, any combination of pre-printed tickets as identified above can be manufactured and sold through the methods identified.

The invention claimed is:

1. A method for providing a random draw lottery ticket comprising:
    (a) receiving, by a third-party transaction processor, a transaction request from a retailer point of sale (POS) to activate the random draw lottery ticket, wherein the random draw lottery ticket is selected by a customer prior to initiation of a check-out process and is presented by the customer for activation during the check-out process, wherein the third-party transaction processor receives transaction requests from a plurality of different retailers;
    (b) providing, via a first secured communication, by the third-party transaction processor or retailer, to a lottery administration system unique identification information associated with random draw lottery information received from the retailer POS without the use of lottery hardware; and
    (c) receiving, via a second secured communication, by the third-party transaction processor or retailer, from the lottery administration system, indication that draw information has been associated with the random draw lottery ticket.

2. The method of claim 1, wherein receiving the transaction request comprises receiving unique product information associated with the random draw lottery ticket over a secure communication channel from the retailer POS.

3. The method of claim 1, wherein draw information is made available on a printed receipt; by scanning a code on the random draw lottery ticket; or by entering a unique identifier associated with random draw lottery ticket into an online website or mobile application.

4. The method of claim 1, further comprising receiving unique product information associated with the random draw lottery ticket, and wherein the third-party transaction processor provides the transaction requests from a plurality of different retailers to a single lottery system.

5. The method of claim 1, further comprising retrieving unique identification information associated with random draw lottery ticket from the received product information.

6. The method of claim 4, wherein the product information is sufficient to determine one or more of:
- a game type associated with random draw lottery ticket;
- a wager amount associated with the random draw lottery ticket; and
- a number of wagers associated with the random draw lottery ticket.

7. The method of claim 1, further comprising validating the received transaction request.

8. The method of claim 7, wherein validating the received identification information comprises verifying that the product information corresponds to identification information associated with the random draw lottery ticket.

9. The method of claim 8, wherein validating the transaction information includes verifying that the product is validly distributed by a retailer of the plurality of retailers.

10. The method of claim 1, wherein the information provided to the lottery administration system includes one or more randomly determined lottery numbers generated at the time the random draw lottery ticket is purchased at the retailer POS.

11. The method of claim 1, wherein the information provided to the lottery administration system includes one or more randomly determined lottery numbers associated with the random draw lottery ticket prior to the time the random draw lottery ticket is purchased at the retailer POS.

12. The method of claim 1, wherein the retailer POS does not use lottery hardware at a retailer location to activate the lottery ticket.

13. The method of claim 1, wherein the random draw lottery ticket comprises a barcode.

14. The method of claim 13, wherein the barcode comprises a first party information and a second party information.

15. The method of claim 13, wherein the barcode comprises a universal product code and pre-printed lottery ticket information.

16. The method of claim 1, wherein random draw lottery ticket contains information used to redeem a winning prize.

17. The method of claim 1, wherein the lottery administration system generates wagers for the random draw lottery ticket and a draw date is assigned to the wagers.

18. The method of claim 1, wherein lottery numbers are entered in a draw.

19. The method of claim 7, wherein the validation comprises age validation.

20. The method of claim 1, wherein the first secured communication, the second secured communication, or combinations thereof are encrypted.

21. The method of claim 1, wherein activation requests are received from the plurality of different retailers and for at least one of the plurality of different retailers, the activation requests are received from a plurality of retailer locations and from a plurality of point of sale terminals at the plurality of retailer locations.

22. The method of claim 21, wherein the activation requests include requests for a plurality of different lottery games.

23. The method of claim 22, further comprising validating, by the third-party transaction processor, transaction information from the plurality of different retailers.

24. The method of claim 22, wherein validating the transaction information includes verifying that a product is validly distributed by a retailer of the plurality of different retailers and, where the product is verified, providing the transaction information to the lottery system.

* * * * *